United States Patent
Yoshimura

(10) Patent No.: US 10,105,641 B2
(45) Date of Patent: Oct. 23, 2018

(54) HYDROGEN PURIFICATION DEVICE AND HYDROGEN PURIFICATION SYSTEM USING HYDROGEN PURIFICATION DEVICE

(71) Applicant: HORIBA STEC, Co., Ltd., Kyoto-shi, Kyoto (JP)

(72) Inventor: Tomotaka Yoshimura, Kyoto (JP)

(73) Assignee: HORIBA STEC, Co., Ltd., Kyoto-shi, Kyoto (JP)

(*) Notice: Subject to any disclaimer, the term of this patent is extended or adjusted under 35 U.S.C. 154(b) by 0 days.

(21) Appl. No.: 15/473,483

(22) Filed: Mar. 29, 2017

(65) Prior Publication Data

US 2017/0291134 A1 Oct. 12, 2017

(30) Foreign Application Priority Data

Apr. 6, 2016 (JP) ................................. 2016-076812

(51) Int. Cl.
*B01D 53/22* (2006.01)
*B01D 65/00* (2006.01)
(Continued)

(52) U.S. Cl.
CPC .......... *B01D 53/228* (2013.01); *B01D 63/081* (2013.01); *B01D 63/087* (2013.01);
(Continued)

(58) Field of Classification Search
CPC .. B01D 53/228; B01D 63/081; B01D 63/087; B01D 65/003; B01D 71/022;
(Continued)

(56) References Cited

U.S. PATENT DOCUMENTS

| 3,469,372 A * | 9/1969 | Isogai | .................... | B01D 53/22 72/60 |
| 6,183,542 B1 | 2/2001 | Bossard | | |
| 2004/0003720 A1* | 1/2004 | Beisswenger | .......... | B01D 53/22 96/11 |
| 2005/0081561 A1* | 4/2005 | Eggleston | ............ | A44C 15/003 63/21 |

(Continued)

FOREIGN PATENT DOCUMENTS

| JP | 2008155118 A | 7/2008 |
| JP | 2009106794 A | 5/2009 |

(Continued)

OTHER PUBLICATIONS

European Patent Office, Extended European Search Report Issued in European Application No. 17000556.5, dated Sep. 7, 2017, Germany, 8 pages.

*Primary Examiner* — Jason M Greene
(74) *Attorney, Agent, or Firm* — Alleman Hall Creasman & Tuttle LLP

(57) ABSTRACT

In order to provide a hydrogen purification device in which a source gas is supplied, from which a purified gas flows out, that is easily manufacturable, and in which the pressure resistance of an hydrogen permeable membrane is high, the hydrogen purification device is configured to include a hydrogen permeable membrane allowing hydrogen to selectively permeate therethrough, two porous supports that sandwich and support the hydrogen permeable membrane from both surfaces thereof, and a casing having a space formed therein configured to accommodate reaction of the source gas and the hydrogen permeable membrane. The porous supports are contained inside the casing, an outermost edge of the hydrogen permeable membrane extends outward from the outer edges of the porous supports in at least one location, and a peripheral portion of the hydrogen permeable membrane in a vicinity of the outermost edge and the casing are airtightly sealed to each other.

7 Claims, 5 Drawing Sheets

(51) Int. Cl.
*B01D 71/02* (2006.01)
*C01B 3/50* (2006.01)
*B01D 63/08* (2006.01)
*C01B 3/56* (2006.01)

(52) U.S. Cl.
CPC ......... *B01D 65/003* (2013.01); *B01D 71/022* (2013.01); *C01B 3/505* (2013.01); *C01B 3/506* (2013.01); *C01B 3/56* (2013.01); *B01D 2256/16* (2013.01); *B01D 2311/103* (2013.01); *B01D 2313/04* (2013.01); *B01D 2325/04* (2013.01); *C01B 2203/0405* (2013.01); *C01P 2006/80* (2013.01)

(58) Field of Classification Search
CPC ............ B01D 2256/16; B01D 2311/03; B01D 2313/04; C01B 3/505; C01B 3/56; C01B 2203/0405
See application file for complete search history.

(56) References Cited

U.S. PATENT DOCUMENTS

| | | | | |
|---|---|---|---|---|
| 2006/0060084 A1* | 3/2006 | Edlund | ............... | B01D 53/22 96/4 |
| 2010/0282085 A1* | 11/2010 | DeVries | ............... | B01D 53/22 96/9 |
| 2011/0171118 A1* | 7/2011 | Hofmann | ............ | B01D 53/229 423/652 |
| 2013/0243660 A1* | 9/2013 | Kim | ................... | B01D 53/228 422/187 |
| 2014/0277322 A1* | 9/2014 | Victorine | ............... | A61N 1/05 607/119 |
| 2016/0181583 A1* | 6/2016 | Fukuoka | ............... | B01D 53/22 429/56 |

FOREIGN PATENT DOCUMENTS

| | | |
|---|---|---|
| JP | 2010201304 A | 9/2010 |
| WO | 2004103537 A1 | 12/2004 |
| WO | 2015019906 A1 | 2/2015 |

* cited by examiner

HYDROGEN PURIFICATION DEVICE AND HYDROGEN PURIFICATION SYSTEM USING HYDROGEN PURIFICATION DEVICE

TECHNICAL FIELD

The present invention relates to a hydrogen purification device used to, for example, produce high purity hydrogen by purification, and to a hydrogen purification system using the hydrogen purification device.

BACKGROUND ART

In a hydrogen purification device used for a hydrogen purification system adapted to produce high purity hydrogen gas by purification, the higher the pressure of a source gas supplied to a hydrogen permeable film allowing hydrogen to selectively permeate therethrough, the larger the flow rate of the hydrogen gas resulting from the permeation and purification through the hydrogen permeable membrane, and therefore the hydrogen permeable membrane requires pressure resistance.

Conventionally, in order to improve the pressure resistance of a hydrogen permeable membrane to pressure from a source gas side, a porous support that supports the hydrogen permeable membrane from a purified gas side of the hydrogen permeable film is provided.

A conventional hydrogen purification device is manufactured by, for example, as described in Patent Literatures 1 and 2, fixing a porous support formed on the surface thereof with a hydrogen permeable membrane by a plating or evaporation method, or a porous support fixed on the surface thereof with a rolled hydrogen permeable membrane by a fixing member to a casing allowing gas to flow inside.

However, since in the conventional hydrogen purification device, the hydrogen permeable membrane is supported from the purified gas side by the porous support, the pressure resistance to the pressure from the source gas side can be improved, but there is the problem that the pressure resistance of the hydrogen permeable membrane to pressure from the purified gas side is low.

Also, in the conventional hydrogen purification device, in order to obtain high purity hydrogen gas, a complicated structure configured to fix the hydrogen permeable membrane on the porous support and further fix the porous support to the casing has to be assembled by airtightly bonding all parts so as to prevent the source gas from bypassing the hydrogen permeable membrane to leak to the purified gas side, and therefore there is a problem of difficult manufacturing.

CITATION LIST

Patent Literature

Patent Literature 1: JP-A 2010-201304
Patent Literature 2: JP-A 2008-155118

SUMMARY OF INVENTION

Technical Problem

The present invention is made in consideration of the above issues, and a main object thereof is to provide a hydrogen purification device that is easily manufacturable and in which the pressure resistance of a hydrogen permeable membrane is high.

Solution to Problem

In the hydrogen purification device according to the present invention, a source gas is supplied and a purified gas flows out. The hydrogen purification device includes a hydrogen permeable membrane allowing hydrogen to selectively permeate therethrough, two porous supports that sandwich and support the hydrogen permeable membrane from both surfaces thereof, and a casing having a space formed therein configured to accommodate reaction of the source gas and the hydrogen permeable membrane. In addition, in the hydrogen purification device, the porous supports are contained inside the casing, an outermost edge of the hydrogen permeable membrane extends outward from the outer edges of the porous supports in at least one location, and a peripheral portion of the hydrogen permeable membrane in a vicinity of the outermost edge and the casing are airtightly sealed to each other.

Since in the hydrogen purification device as described above, the hydrogen permeable membrane is sandwiched and supported from both of the surfaces thereof by the porous supports, even when pressure is applied from a purified gas side due to a contingency, damage to the hydrogen permeable membrane can be prevented.

Also, the hydrogen permeable membrane has pressure resistance to pressure from any of the source gas side and the purified gas side, and therefore even when attaching the hydrogen purification device to a hydrogen purification system with either surface of the hydrogen permeable membrane made to face toward the source gas side, the hydrogen purification system can be used without any problem.

Also, since the peripheral portion of the hydrogen permeable membrane in the vicinity of the outermost edge and the casing are airtightly sealed to each other, and thereby the source gas can be prevented from slipping by the hydrogen permeable membrane to leak to the purified gas side, it is not necessary to airtightly seal the hydrogen permeable membrane and the porous supports together, and the porous supports and the casing together, and consequently the manufacturing of the hydrogen purification device can be simplified.

As long as the hydrogen purification device is such that both the surfaces of the hydrogen permeable membrane are welded to the casing, the hydrogen permeable membrane and the casing can be airtightly sealed to each other without the need for any special part or the like, and consequently the manufacturing can be further simplified.

As long as the portion and the casing are airtightly sealed by at least a welded part in the vicinity of the outermost edge and the casing, and a heat concentration structure is formed at least partially around the welded part to concentrate heat during welding of the welded part, when welding the hydrogen permeable membrane to the casing, it is only necessary to heat the part corresponding to the heat concentration structure, and therefore the welding can be performed in a short time as compared with when no heat concentration structure is present.

Further, since the welding requires only a relatively short heating time, a reduction in the hydrogen permeability of the hydrogen permeable membrane due to the effect of heat can be reduced.

As long as one of the two porous supports is a first porous support which supports the hydrogen permeable membrane from an inflow side of the purified gas and the other of the two porous supports is a second porous support which supports the hydrogen permeable membrane from an outflow side of the source gas, and between the first porous support and the casing, a source gas inflow space in which the source gas flows is provided, as compared with when no space is provided, the source gas supplied easily spreads in the casing and is more likely to contact the hydrogen permeable membrane, and therefore the amount of source gas that is to be discharged without contacting the hydrogen permeable membrane can be reduced.

Specific embodiments of the present invention can include one in which a source gas supply port for supplying the source gas and a source gas discharge port for discharging the source gas not permeating through the hydrogen permeable membrane are provided in the casing, one of the source gas supply port and the source gas discharge port opens toward a first containing space containing the first porous support and the other of the source gas supply port and the source gas discharge port opens toward the source gas inflow space, and around the one of the source gas supply port and the source gas discharge port, a barrier wall which partitions between the source gas inflow space and the source gas supply port or the source gas discharge port is provided in contact with the first porous support. Accordingly, it is possible to suppress the source gas to be supplied only through the source gas inflow space and discharged from the source gas discharge port so as to further reduce the amount of source gas that is discharged outside without coming into contact with the hydrogen permeable membrane.

Specific embodiments of the present invention can include one in which the hydrogen permeable membrane is made of a palladium alloy.

Also, specific embodiments of the present invention can include one in which the porous supports are metallic sintered bodies.

Further, specific embodiments of the present invention can include a hydrogen purification system having the hydrogen purification device, a source gas supply mechanism which supplies the source gas to the hydrogen purification device, and a temperature control mechanism which controls a temperature of the hydrogen purification device.

Advantageous Effects of Invention

Since in the hydrogen purification device as described above, the hydrogen permeable membrane is sandwiched and supported from both of the surfaces thereof by the porous supports, even when pressure is applied from the purified gas side due to a contingency, damage to the hydrogen permeable membrane can be prevented.

Also, the hydrogen permeable membrane has pressure resistance to pressure from any of the source gas side and the purified gas side, and therefore even when attaching the hydrogen purification device to the hydrogen purification system with any surface of the hydrogen permeable membrane made to face toward the source gas side, the hydrogen purification system can be used without any problem.

Also, since the peripheral portion of the hydrogen permeable membrane extending outward from the outer edges of the porous supports and the casing are airtightly bonded to each other, and thereby the source gas can be prevented from bypassing the hydrogen permeable membrane to leak to the purified gas side, it is not necessary to airtightly bond the hydrogen permeable membrane and the porous supports together and the porous supports and the casing together, and consequently the manufacturing of the hydrogen purification device can be simplified.

DESCRIPTION OF EMBODIMENTS

In the following, one embodiment of the present invention will be described using drawings.

A hydrogen purification device 1 according to the present invention is one used in a hydrogen purification system 100 that produces high purity hydrogen having a purity of 7N or more, by purification, usable as, for example, carrier gas and make-up gas used for gas chromatography, also fuel for a hydrogen flame ionization detector, or the like.

Figure 1:
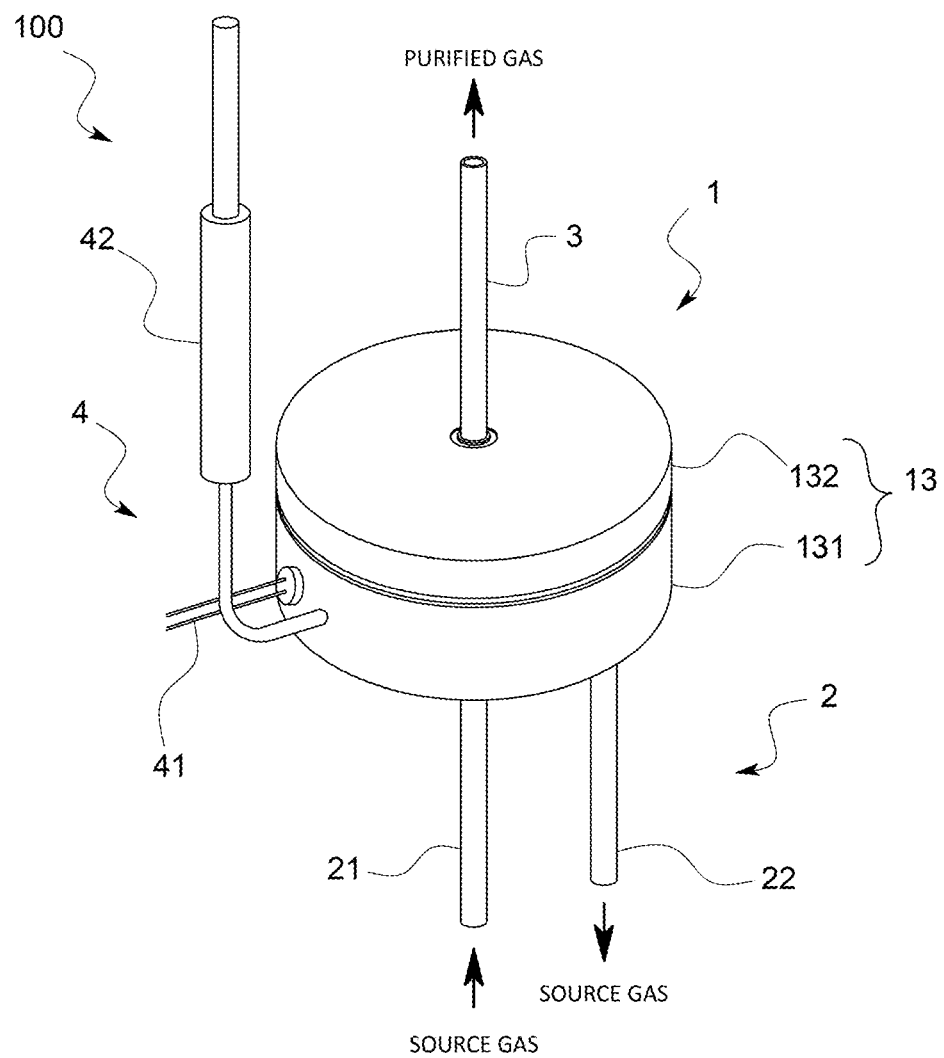
FIG. 1 is a schematic structural diagram of a hydrogen purification device according to one embodiment of the present invention.

The hydrogen purification system 100 is one that as illustrated in FIG. 1, includes the hydrogen purification device 1, a source gas supply mechanism 2 adapted to supply source gas to the hydrogen purification device 1, a purified gas outflow pipe 3 for leading the purified hydrogen gas outside from the hydrogen purification device 1, and a temperature control mechanism 4 including a thermocouple 41 and a heater 42 to control the temperature of the hydrogen purification device 1.

Also, the hydrogen purification system 100 is one that is connected to, for example, a high-pressure gas container storing the source gas, a hydrogen generator, and the like, and by feeding the source gas containing hydrogen supplied from the high-pressure gas container and the hydrogen generator to the hydrogen purification device 1 by the source gas supply mechanism 2, and separating only hydrogen gas from the source gas by the hydrogen purification device 1, produces the high purity hydrogen gas by purification.

Figure 2:
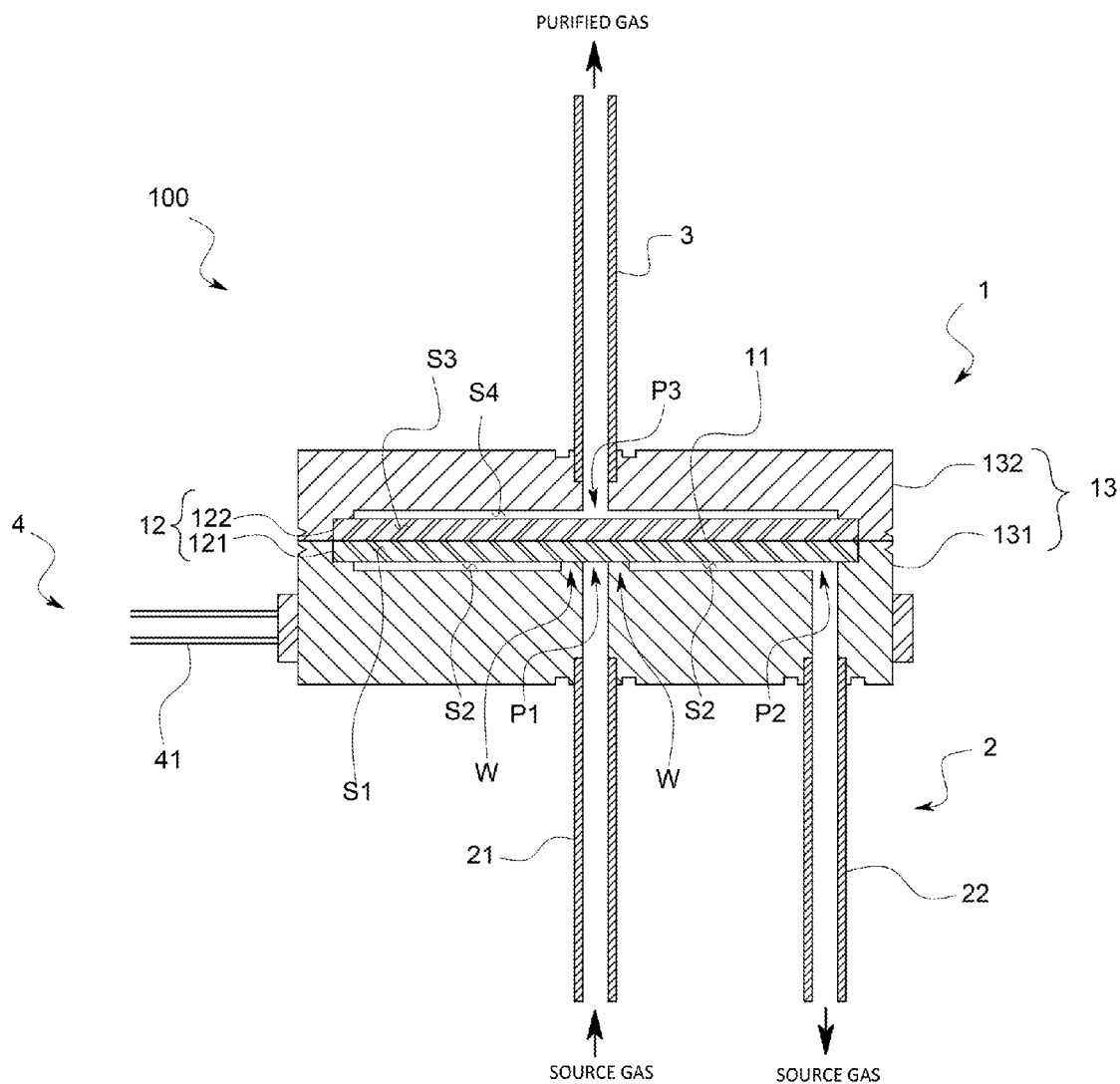
FIG. 2 is a cross-sectional view of the hydrogen purification device according to the present embodiment.

The hydrogen purification device 1 adapted to separate hydrogen gas from the source gas is one that as illustrated in FIG. 2, includes a hydrogen permeable membrane 11 allowing hydrogen to selectively permeate therethrough, two porous supports 12 sandwiching both the surfaces of the hydrogen permeable membrane 11 to support the hydrogen permeable membrane 11, and a casing 13 allowing the hydrogen permeable membrane 11 and the source gas to react with each other in a space formed inside.

The hydrogen permeable membrane 11 has the property of reacting with hydrogen molecules and hydrogen atoms contained in the source gas under a high temperature condition of, for example, approximately 400° C. to change the hydrogen molecules to hydrogen atoms or the hydrogen atoms to hydrogen molecules. Since a hydrogen atom is small in particle size as compared with the other gas molecules, and can permeate through the hydrogen permeable membrane 11 by diffusion, only a hydrogen molecule is separated from the source gas.

The hydrogen permeable membrane 11 is a circular-shaped thin film having a film thickness of, for example, 10

μm formed by, for example, rolling a palladium alloy containing 40 wt % of copper.

Each of the porous supports 12 is a porous body having holes with sizes allowing the source gas to permeate therethrough, and for example, a disc-shaped one having a diameter smaller than the diameter of the hydrogen permeable membrane 11.

For the porous supports 12, in order to sandwich and support the hydrogen permeable membrane 11 from both the surfaces, for example, two porous supports 12 having the same shape are prepared.

Also, each of the porous supports 12 is, for example, one formed of a metallic sintered body that is formed as the porous body by heating powdered metal particles at a temperature of a melting point or less to bind the particles.

The casing 13 is, for example, a cylindrically-shaped one containing the porous supports 12 in the space formed inside.

Also, the casing 13 is one including a cylindrically-shaped first casing member 131 made of, for example, stainless steel; and a cylindrically-shaped second casing 132 that is coaxially arranged sandwiching the hydrogen permeable membrane 11 with the first casing member 131 and made of, for example, stainless steel.

The first casing member 131 is formed from the side thereof contacting the hydrogen permeable membrane 11 toward the inside thereof with a columnar-shaped first containing space S1 of which the inside diameter is the same as the outside diameter of the other of the porous supports 12 as a first porous support 121 which supports the hydrogen permeable membrane 11 from an inflow side of the source gas, and the length thereof in the axial direction is the same as the thickness of the first porous support 121.

In addition, adjacently to the first containing space S1, the first casing 131 is further formed with a donut-shaped source gas inflow space S2 having an outer ring with a smaller inside diameter than the outside diameter of the first porous support 121.

The second casing member 132 is formed from the side contacting the hydrogen permeable membrane 11 toward the inside thereof with a columnar-shaped second containing space S3 of which the inside diameter is the same as the outside diameter of one of the porous supports 12 as a second porous support 122 which supports the hydrogen permeable membrane 11 from an outflow side of the purified gas, and the length of which in the axial direction is the same as the thickness of the second porous support 122.

In addition, adjacently to the second containing space S3, the second casing member 132 is further formed with a columnar-shaped purified gas outflow space S4 having a smaller inside diameter than the outside diameter of the porous supports 12.

The volume of the purified gas outflow space S4 is smaller than the volume of the second containing space S3, and the total volume of the second containing space S3 and the purified gas outflow space S4, i.e., the volume inside the casing 13 on the outflow side of the purified gas of the hydrogen permeable membrane 11 is, for example, 1 cc.

In the first casing member 131, a source gas supply port P1 for supplying the source gas from outside the hydrogen purification device 1 into the first containing space S1 is formed.

Also, in the first casing member 131, the source gas inflow space S2 for retaining the source gas and a source gas discharge port P2 for discharging the source gas having reacted with the hydrogen permeable membrane 11 from the source gas inflow space S2 are formed.

In the second casing member 132, a purified gas outflow port P3 for the purified gas to flow outside the casing 13 from the purified gas outflow space S4 is formed.

Figure 3:
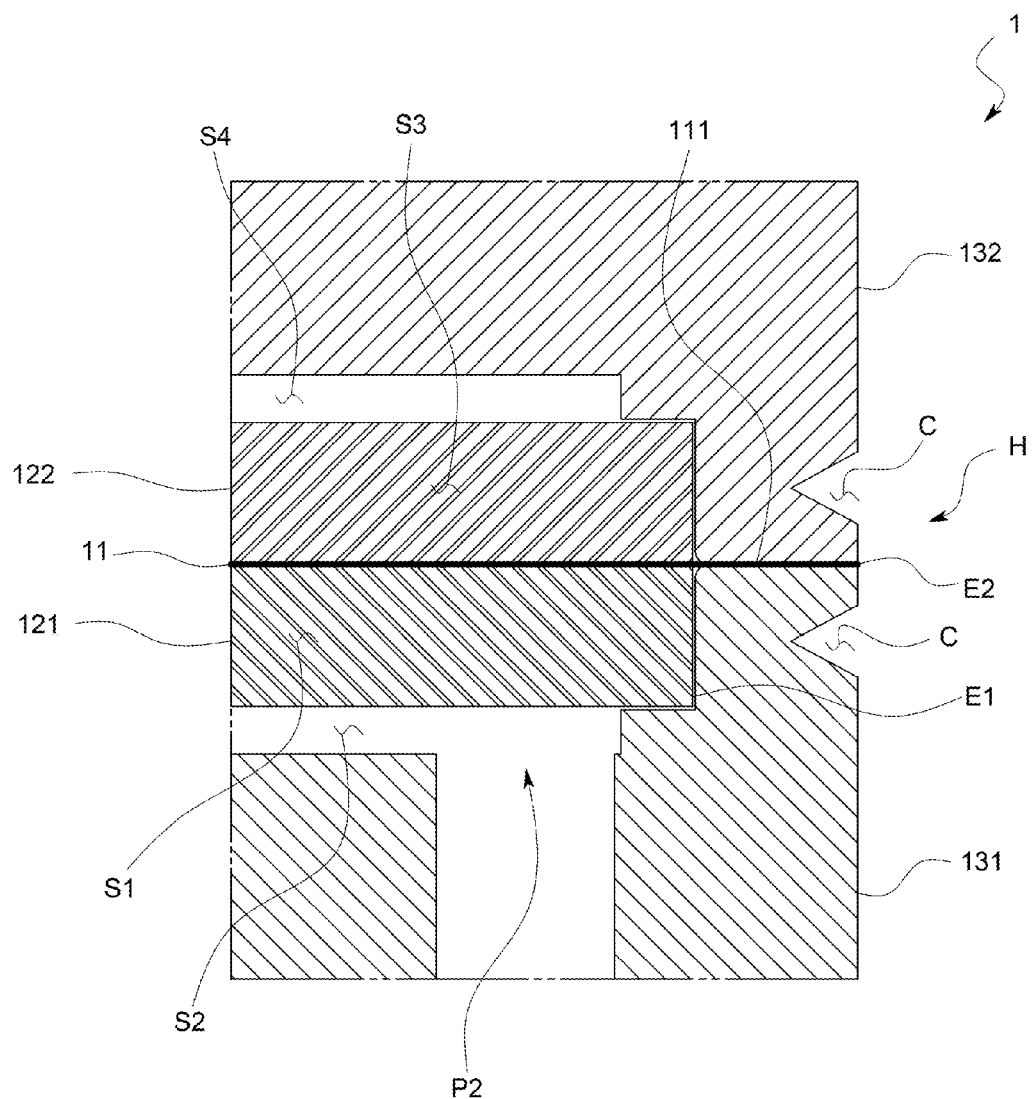
FIG. 3 is a schematic diagram of a heat concentration structure of the hydrogen purification device according to the present embodiment.

As illustrated in FIG. 3, the first casing member 131 and the second casing member 132 have cross-sectionally V-shaped cutout parts C that are formed so as to circle around the side circumferential surfaces at positions separated from the surfaces contacting the hydrogen permeable membrane 11 by, for example, approximately 170 respectively and correspondingly.

The two cutout parts C respectively formed in the first casing member 131 and the second casing member 132 form a heat concentration structure H together with a welded part welding one of the first casing member 131 and the second casing member 132 to the peripheral portion 111 of the hydrogen permeable membrane 11.

A method for manufacturing the hydrogen purification device 1 is as follows.

First, the porous supports 12 are respectively contained in the first containing space S1 and the second containing space S3 one by one, and the hydrogen permeable membrane 11 is sandwiched from both the surfaces by the first casing member 131 and the second casing member 132 respectively containing the porous supports 12.

When doing this, the hydrogen permeable membrane 11 is arranged in accordance with the following conditions: The peripheral portion 111 of the hydrogen permeable membrane 11 is positioned on the outer side than the outer edges E1 of the surfaces of the two porous supports 12 that are fixed so as to sandwich the hydrogen permeable membrane 11 from both the surfaces and contact the hydrogen permeable membrane 11, i.e., than the side circumferential surfaces of the porous supports 12; and the outermost edge E2 of the peripheral portion 111 of the hydrogen permeable membrane 11, which protrudes parallel to the surfaces of the two porous supports 12 contacting the hydrogen permeable membrane 11, is further protruded from the outer edges E1 of the two porous supports 12 toward the outside, for example, protruded outward of the side circumferential surface of the casing 13 at its whole circumstance.

Here, the peripheral portion 111 is a portion extending outward from a portion sandwiched by the two porous supports 12 of the hydrogen permeable membrane 11. The peripheral portion 111 is a region including at least the welded part described in more detail below.

Subsequently, at least a portion of the heat concentration structure H formed circulating around the side surfaces of the first casing member 131 and the second casing member 132, respectively and correspondingly, is welded around itself from the end surface of the hydrogen permeable membrane 11 by some means such as laser welding, and thereby the hydrogen permeable membrane 11 and a set of the first casing member 131 and the second casing member 132 are airtightly welded to each other.

The welded part to be welded at this time refers to a range irradiated by the laser beam during laser welding and a range where the peripheral portion 111 of the hydrogen permeable membrane 11 and the casing 13 are welded by laser welding.

When using the hydrogen purification device 1 manufactured as described above to purify the source gas into hydrogen gas, the hydrogen-containing source gas supplied from such as the high-pressure gas container and the hydrogen generator is supplied into the casing 13 by the source gas supply mechanism 2 through a source gas supply pipe 21 connected to the source gas supply port P1.

A portion of the source gas supplied into the casing 13 permeates through the porous support 12 in the first containing space S1 and moves while contacting the hydrogen permeable membrane 11, and the remaining portion of the source gas not permeating through the hydrogen permeable membrane 11 is discharged outside the hydrogen purification device 1 through a source gas discharge pipe 22 connected to the source gas discharge port P2 provided to the source gas inflow space S2.

On the other hand, hydrogen gas as purified gas resulting from the permeation through the hydrogen permeable membrane 11 permeates through the second porous support 122 in the second containing space S3, is extruded to the purified gas outflow space S4 formed in the second casing member 132, and flows outside the hydrogen purification device 1 from the purified gas outflow port P3 formed in the purified gas outflow space S4 through a purified gas outflow pipe 3.

As a result of using the hydrogen purification device 1 configured as described above to produce hydrogen gas by purification, the purity of the purified hydrogen was 99.999996%, and thus, it has been confirmed that when using the hydrogen purification device according to the present embodiment, high purity hydrogen gas having a purity of 7N or more can be produced by purification.

Since in the hydrogen purification device 1 configured as described above, the hydrogen permeable membrane 11 is supported from both the surfaces thereof by the two porous supports 12, not only against pressure from the source gas side, but also when pressure is temporarily placed from the purified gas side rather than the source gas side due to a contingency, a risk of damaging the hydrogen permeable membrane 11 can be reduced.

Also, since the hydrogen permeable membrane 11 has pressure resistance to pressure from any of both sides of the hydrogen permeable membrane 11, when attaching the hydrogen purification device 1 to the hydrogen purification system 100, whichever surface of the hydrogen permeable membrane 11 is made to face to the source gas side for the attachment, the hydrogen purification system 100 can be used without any problem.

Further, since the hydrogen permeable membrane 11 is airtightly sealed to the first casing member 131 and the second casing member 132, and therefore the porous supports 12 are not required to be airtightly sealed to any of the hydrogen permeable membrane 11 and the first casing member 131 and the second casing member 132, the manufacturing of the hydrogen purification device 1 can be simplified.

Still further, since the peripheral portion 111 of the hydrogen permeable membrane 11 and the casing 13 are bonded to each other by welding from the end surface of the hydrogen permeable membrane 11, the airtight sealing can be performed without using any special fixing member or the like, such as an O-ring for keeping airtightness, which has been conventionally required for fixing the hydrogen permeable membrane 11 to the porous supports 12 and the casing 13, Also, since as long as the cutout parts C are provided in the side surfaces of the first casing member 131 and the second casing member 132 and a part corresponding to the heat concentration structure H is welded, the spread of heat to the surrounding area can be blocked by the cutout parts C, heat caused by the welding is concentrated on the heat concentration structure H, and therefore the welding requires less time. As a result, a reduction in the hydrogen permeability of the hydrogen permeable membrane 11 due to the effect of the heat can be suppressed.

Further, since by sandwiching the hydrogen permeable membrane 11 between the first casing member 131 and the second casing member 132 respectively containing the porous supports 12 one by one, and then finally welding the part corresponding to the heat concentration structure H around itself, both the surfaces of the hydrogen permeable membrane 11 sandwiched between the first casing member 131 and the second casing member 132 are respectively airtightly sealed to the first casing member 131 and the second casing member 132 at the same time, the manufacturing of the hydrogen purification device 1 can be simplified.

Still further, since the first containing space S1 and the second containing space S3 are configured to just contain the porous supports 12, respectively, when performing welding with the hydrogen permeable membrane 11 sandwiched by the first casing member 131 and the second casing member 132 respectively containing the first porous support 121 and second porous support 122 in the first containing space S1 and the second containing space S3 one by one, the porous supports 12 can be fixed substantially without backlash in a state of sandwiching both the surfaces of the hydrogen permeable membrane 11.

Since the total volume of the second containing space S3 and purified gas outflow space S4 formed inside the second casing member 132 is as small as 1 cc, and therefore the amount of air present in the space inside the casing 13 on the outflow side of the purified gas of the hydrogen permeable membrane 11 before starting to flow the source gas is small, the time from when starting to supply the source gas to when the purified gas having a target purity is obtained can be kept relatively short.

Furthermore, since the second containing space S3 has substantially the same volume as the volume of the second porous support 122 and the volume of the purified gas outflow space S4 is smaller than the second containing space S3, the surface area of the space in contact with a surface portion of the second porous support 122 is enlarged so as to increase the amount of purified gas per unit time from the second porous support 122, and thus it is possible to achieve the effect of obtaining the purified gas at a target purity relatively shortly after the supply of the source gas has begun.

Also, since the donut-shaped source gas inflow space S2 is provided in the first casing member 131 and the source gas supplied to the first containing space S1 is retained inside the source gas inflow space S2 and then part of the source gas moves toward the source gas discharge port P2, the contact area between the hydrogen permeable membrane 11 and the source gas is increased, and the amount of the source gas to be discharged from the source gas discharge port P2 without touching the hydrogen permeable membrane 11 can be reduced.

Further, the source gas inflow space S2 is donut shaped and in the vicinity of the source gas supply port P1 opening toward the first containing space S1, at a position in contact with the first porous support 121, a barrier W separating the source gas supply port P1 and the source gas inflow space S2 is formed so that the source gas supplied to the first containing space S1 can be prevented from directly flowing into the source gas inflow space S2. Thus, it is possible to further reduce the source gas discharged outside without coming into contact with the hydrogen permeable membrane 11.

Further, since the metallic sintered body is used as each of the porous supports 12, the hydrogen permeable membrane 11 can be provided with sufficient pressure resistance without interfering with the reaction between the source gas and the hydrogen permeable membrane 11.

Note that the present invention is not limited to the above-described embodiment.

Figure 4:
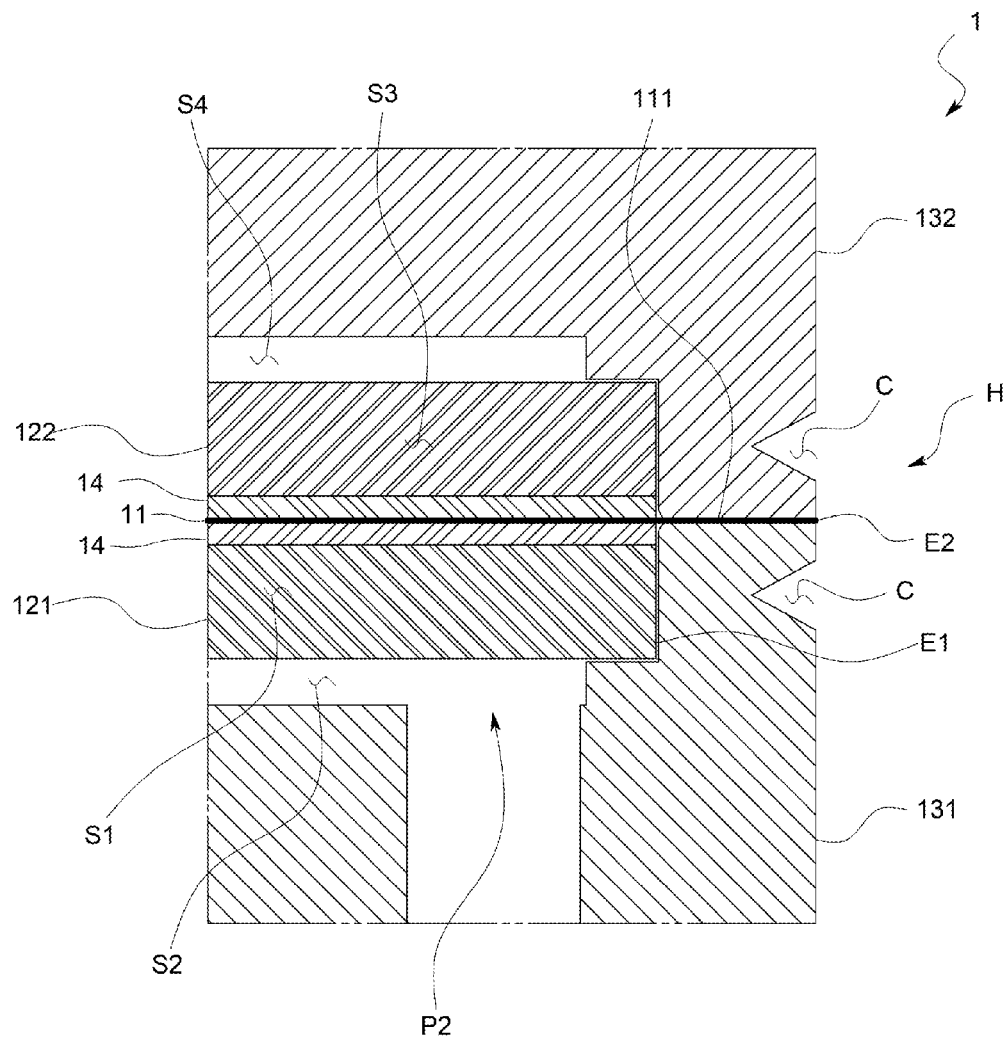
FIG. 4 is a schematic structural diagram of a hydrogen purification device according to another embodiment of the present invention.

For example, as illustrated in FIG. 4, the hydrogen purification device may be one including filter papers 14 made of a material containing silicon oxide such as glass or quartz, a silicon oxide compound, or the like between the hydrogen permeable membrane and the porous supports.

When the porous supports 12 are made of metal, the hydrogen permeable membrane 11 contacts the porous supports 12, and as a result, depending on a metal component contained in the porous supports 12, may be deteriorated.

In that case, as long as the filter papers made of glass or quartz are interposed between the hydrogen permeable membrane 11 and the porous supports 12, the direct contact between the hydrogen permeable membrane 11 and the porous supports 12 can be avoided, and therefore the risk of deteriorating the hydrogen permeable membrane 11 can be more reduced.

Figure 5:
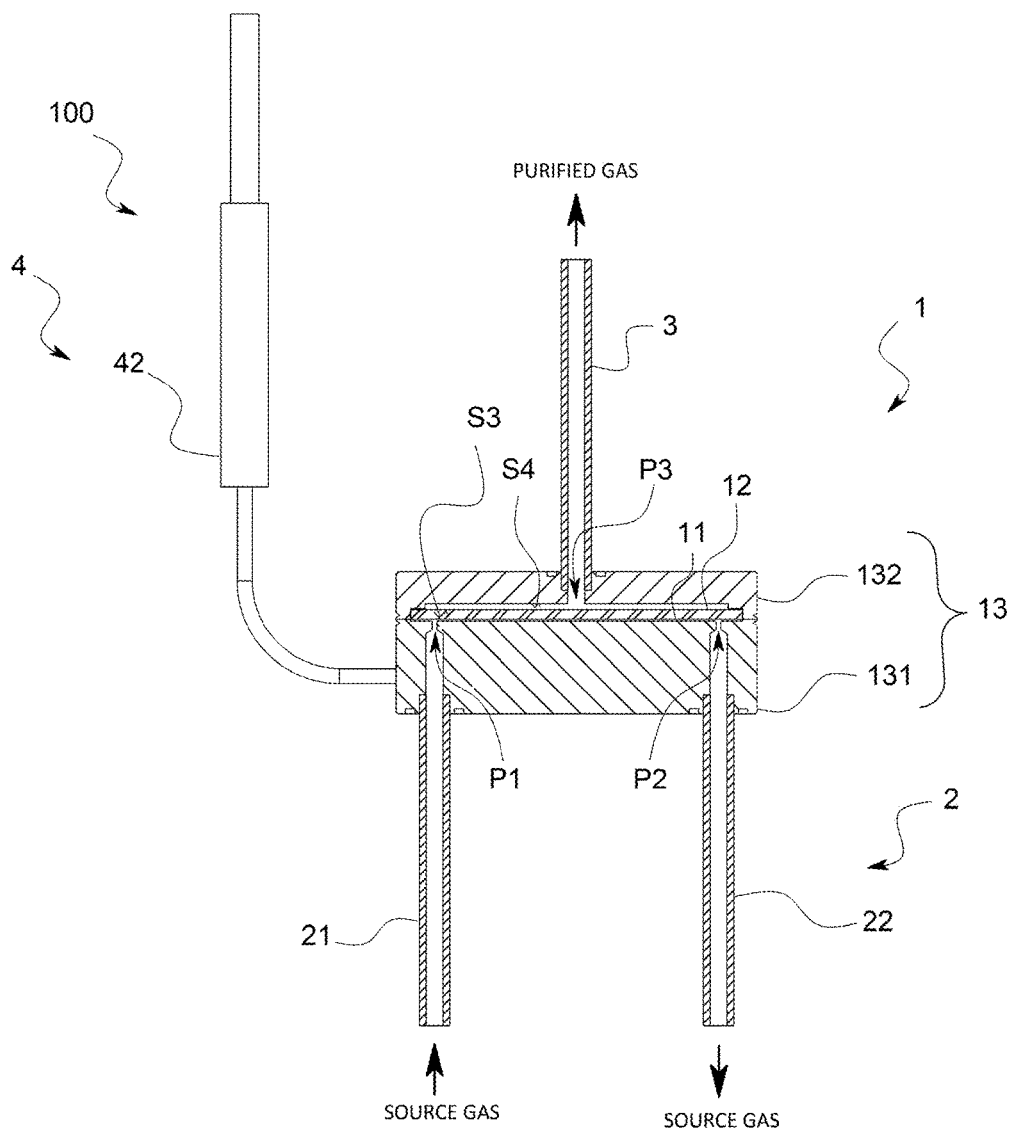
FIG. 5 is a schematic structural diagram of a hydrogen purification device according to still another embodiment of the present invention.

The hydrogen purification device 1 according to the present embodiment is configured to include the two porous supports 12 sandwiching and holding the hydrogen permeable membrane 11 from both of the surfaces, and thereby allow the hydrogen permeable membrane 11 to have pressure resistance to pressure from any of the source gas side and the purified gas side, but as illustrated in FIG. 5, may be configured to support the hydrogen permeable membrane 11 by a porous support 12 only from one side.

The hydrogen purification device may be configured to form the source gas supply port P1 in the source gas inflow space S2 formed in the first casing member 131 and form the source gas discharge port P2 in the first containing space S1 formed in the first casing member 131.

In this case, when using the hydrogen purification device 1 to produce hydrogen gas by purification, the source gas is fed from the source gas supply port P1 to the source gas inflow space S2, and permeates through the porous support 12 to react with the hydrogen permeable membrane 11, and then part of the source gas is discharged outside the hydrogen purification device 1 from the first containing space S1 through the source gas discharge port P2.

For example, the hydrogen permeable membrane 11 may be one containing 10 wt % or more to 50 wt % or less of copper to the whole of the palladium alloy, or may be made of a palladium alloy containing at least one element selected from the group consisting of copper, silver, gold, platinum, yttrium, and gadolinium.

Also, the hydrogen permeable membrane 11 is not limited to the circular-shaped one, but may be a rectangular-shaped one, or another polygonal-shaped or differently shaped one.

The thickness of the hydrogen permeable membrane 11 is not limited to 10 μm, but is only required to be 1 μm or more to 100 μm or less, preferably 5 μm or more to 15 μm or less.

Each of the porous supports 12 is not limited to the metallic sintered body, but is only required to be made of a material capable of, without preventing the reaction between the source gas and the hydrogen permeable membrane 11, providing the hydrogen permeable membrane 11 with pressure resistance under a high temperature condition of approximately 400° C., and may be formed of a member such as a ceramic as an inorganic sintered body regardless of whether it is metal or nonmetal, a mesh containing metal or a punching plate formed by boring a number of holes in a plate containing metal.

Also, each of the porous supports 12 is not limited to the disc-shaped one, but may be a rectangular-shaped plate or another polygonal-shaped or differently-shaped plate.

Further, the porous supports 12 are not the two having the same shape, but may be a set of two having different shapes.

The casing 13 is not limited to the one made of stainless steel called stainless use steel (SUS), but is only required to be one characterized by not adsorbing hydrogen gas.

Also, in order to reduce the amount of using SUS or the like forming the casing 13 and simplify the temperature control using the heater and the like, the thickness of the walls of the casing 13 may be minimized.

The casing 13 is not limited to the cylindrically-shaped one, but may be a rectangular-parallelepiped one, another polygonal prism one, a differently shaped prism one, or the like.

The hydrogen permeable membrane 11 is not limited to the one having the outermost edge E2 protruding outward of the casing when sandwiched by the first casing member 131 and the second casing member 132, but may be one having the outermost edge E2 flush with the side surface of the casing 13, or one having the outermost edge E2 positioned on the outer side than the outer edges E1 of the porous supports 12 and on the inner side than the side surface of the casing 13.

The cutouts C that form the heat concentration structure H and are formed in the side circumferential surfaces of the first casing member 131 and the second casing member 132 are only required to be ones capable of forming a heat concentration structure H on which heat is concentrated at the time of welding, but not limited to the cross-sectionally V-shaped ones, and may be ones such as cross-sectionally semicircular-shaped ones, quadrangular-shaped ones, other polygonal-shaped ones, or differently-shaped ones.

Also, the positions where the cutout parts C are formed are not limited to the ones separated from the surfaces of the casing 13 contacting the hydrogen permeable membrane 11 by 170 μm, but may be ones within 170 μm inclusive from the surfaces or ones separated from the surfaces by 170 μm or more.

The cutout parts C formed circulating around the side circumferential surfaces of the first casing member 131 and the second casing member 132 may be partially broken.

Also, the heat concentration structure H may be spaced apart from the surface of the hydrogen permeable membrane 11 by a predetermined distance in a direction perpendicular to the plane of the hydrogen permeable membrane 11, and is not limited to the one formed by the cutout parts C, but may be, for example, one configured to include protruding parts protruding radially outward of the side circumferential surface of the casing 13 in the vicinity of the welded part.

As long as the hydrogen permeable membrane 11 is airtightly sealed to the casing 13, the sealing method is not limited to the welding described above, and other sealing methods such as adhesive sealing may be used.

In addition, embodiments of the present invention can be variously modified and combined without departing from the scope thereof.

LIST OF REFERENCE CHARACTERS

Hydrogen purification system 100
Hydrogen purification device 1
Hydrogen permeable membrane 11
Porous support 12
First porous support 121
Second porous support 122
Casing 13
First casing member 131
Second casing member 132

First containing space S1
Source gas inflow space S2
Second containing space S3
Purified gas outflow space S4
Outer edge of porous support E1
Outermost edge of hydrogen permeable membrane E2
Peripheral portion of hydrogen permeable membrane 111
Heat concentration structure H
Barrier wall W

The invention claimed is:

1. A hydrogen purification device in which a source gas is supplied and from which a purified gas flows out, comprising:
 a hydrogen permeable membrane allowing hydrogen to selectively permeate therethrough;
 two porous supports that sandwich and support the hydrogen permeable membrane from both surfaces thereof; and
 a casing having a space formed therein configured to accommodate reaction of the source gas and the hydrogen permeable membrane;
 wherein:
  the porous supports are contained inside the casing;
  an outermost edge of the hydrogen permeable membrane extends outward from outer edges of the porous supports in at least one location;
  a peripheral portion of the hydrogen permeable membrane in a vicinity of the outermost edge and the casing are airtightly sealed to each other by at least a welded part in the vicinity of the outermost edge and the casing,
  a heat concentration structure is formed at least partially around the welded part to concentrate heat during welding of the welded part, and
  the heat concentration structure is formed circulating around a side surface of the casing.

2. The hydrogen purification device according to claim 1, wherein
 both of the surfaces of the hydrogen permeable membrane are welded to the casing.

3. The hydrogen purification device according to claim 1, wherein
 one of the two porous supports is a first porous support which supports the hydrogen permeable membrane from an inflow side of the purified gas and the other of the two porous supports is a second porous support which supports the hydrogen permeable membrane from an outflow side of the source gas, and
 between the first porous support and the casing, a source gas inflow space into which the source gas flows is provided.

4. The hydrogen purification device according to claim 3, wherein
 a source gas supply port for supplying the source gas and a source gas discharge port for discharging the source gas not permeating through the hydrogen permeable membrane are provided in the casing,
 one of the source gas supply port and the source gas discharge port opens toward a first containing space containing the first porous support and the other of the source gas supply port and the source gas discharge port opens toward the source gas inflow space, and
 around the one of the source gas supply port and the source gas discharge port, a barrier wall which partitions between the source gas inflow space and the source gas supply port or the source gas discharge port is provided in contact with the first porous support.

5. The hydrogen purification device according to claim 1, wherein
 the hydrogen permeable membrane is made of a palladium alloy.

6. The hydrogen purification device according to claim 1, wherein
 the porous supports are respectively metallic sintered bodies.

7. A hydrogen purification system comprising the hydrogen purification device according to claim 1;
 a source gas supply mechanism which supplies the source gas to the hydrogen purification device; and
 a temperature control mechanism which controls a temperature of the hydrogen purification device.

* * * * *